(12) United States Patent
Minekawa et al.

(10) Patent No.: US 12,511,729 B2
(45) Date of Patent: Dec. 30, 2025

(54) DEFECT CLASSIFICATION DEVICE AND DEFECT CLASSIFICATION PROGRAM

(71) Applicant: Hitachi High-Tech Corporation, Tokyo (JP)

(72) Inventors: Yohei Minekawa, Tokyo (JP); Takehiro Hirai, Tokyo (JP); Satoshi Takada, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 512 days.

(21) Appl. No.: 17/769,584

(22) PCT Filed: Aug. 24, 2020

(86) PCT No.: PCT/JP2020/031826
§ 371 (c)(1),
(2) Date: Apr. 15, 2022

(87) PCT Pub. No.: WO2021/075152
PCT Pub. Date: Apr. 22, 2021

(65) Prior Publication Data
US 2024/0127421 A1    Apr. 18, 2024

(30) Foreign Application Priority Data
Oct. 18, 2019 (JP) .................................. 2019-190939

(51) Int. Cl.
*G06T 7/00* (2017.01)
*G06V 10/764* (2022.01)

(52) U.S. Cl.
CPC .......... *G06T 7/0008* (2013.01); *G06V 10/764* (2022.01); *G06T 2207/30148* (2013.01)

(58) Field of Classification Search
None
See application file for complete search history.

(56) References Cited

U.S. PATENT DOCUMENTS 9,020,237 B2    4/2015  Hirai et al.
9,715,723 B2 *  7/2017  Shlain ................. G06V 10/764
(Continued)

FOREIGN PATENT DOCUMENTS

JP    2013-137203 A    7/2013
JP    2013-224942 A   10/2013
(Continued)

OTHER PUBLICATIONS

International Search Report (PCT/ISA/210) issued in PCT Application No. PCT/JP2020/031826 dated Nov. 10, 2020 with English translation (five (5) pages).

(Continued)

*Primary Examiner* — Soo Shin
(74) *Attorney, Agent, or Firm* — Crowell & Moring LLP

(57) ABSTRACT

An object of the present disclosure is to provide a defect classification device capable of easily grasping an appropriate recipe update timing of an imaging device when classification accuracy for classifying defects existing on a semiconductor wafer is decreased. The defect classification device according to the present disclosure calculates classification accuracy by further acquiring a result of a manual classification for defects spanning a plurality of classification spaces as a result of an automatic classification, and comparing the result of the automatic classification with the result of the manual classification (see FIG. 5).

6 Claims, 7 Drawing Sheets

(56) References Cited

U.S. PATENT DOCUMENTS

| | | | | |
|---|---|---|---|---|
| 10,043,264 | B2* | 8/2018 | Greenberg | G06T 7/001 |
| 10,810,733 | B2* | 10/2020 | Kondo | G06V 10/764 |
| 12,046,445 | B2* | 7/2024 | Nagao | G06T 7/001 |
| 2012/0141012 | A1* | 6/2012 | Sakai | H01L 22/20 |
| | | | | 382/149 |
| 2014/0331173 | A1 | 11/2014 | Minekawa et al. | |
| 2015/0022637 | A1* | 1/2015 | Saeki | G06T 7/0004 |
| | | | | 348/46 |
| 2018/0106732 | A1* | 4/2018 | Plihal | G01N 21/8803 |
| 2019/0228522 | A1* | 7/2019 | Shinoda | G06T 7/001 |
| 2019/0294923 | A1* | 9/2019 | Riley | G06F 18/24 |
| 2020/0083017 | A1* | 3/2020 | Harada | G01N 21/956 |
| 2020/0250801 | A1* | 8/2020 | He | G06T 7/0008 |

FOREIGN PATENT DOCUMENTS

| | | |
|---|---|---|
| JP | 2013-224943 A | 10/2013 |
| WO | WO 2011/155123 A1 | 12/2011 |

OTHER PUBLICATIONS

Japanese-language Written Opinion (PCT/ISA/237) issued in PCT Application No. PCT/JP2020/031826 dated Nov. 10, 2020 (six (6) pages).

\* cited by examiner

DEFECT CLASSIFICATION DEVICE AND DEFECT CLASSIFICATION PROGRAM

TECHNICAL FIELD

The present disclosure relates to a technique for classifying defects of a semiconductor wafer.

BACKGROUND ART

In order to ensure a high yield in a semiconductor manufacturing process, it is important to detect defects occurring in the manufacturing process at an early stage and to take measures. In order to take appropriate measures, it is important to manage defect images in accordance with the type of defect.

PTL 1 discloses an auto defect classification (ADC) that automatically performs a defect classification work in order to perform management according to the type of defect. PTL 1 further discloses a manual defect classification (MDC) for manually classifying the defect image as a method for complementing the classification by the ADC.

PTL 1 further describes a method for evaluating a classification accuracy rate of the ADC. In the same literature, the reliability of the ADC is evaluated by calculating the classification accuracy rate by using the total number of defects determined to be classified into a specific category as a denominator as a result of the MDC, and using the number of successful classifications of the ADC in the category as a numerator.

CITATION LIST

Patent Literature

PTL 1: WO 2011/155123 (Corresponding U.S. Pat. No. 9,020,237)

SUMMARY OF INVENTION

Technical Problem

One of factors that cause a decrease in classification accuracy of the ADC is that inspection conditions are not appropriately set. An image acquisition tool such as a scanning electron microscope (SEM) for inspecting a semiconductor wafer is controlled by an operation program called a recipe. When the inspection conditions are not appropriately set, a proper classification cannot be performed, and thus it is desirable to specify a decrease in classification accuracy at an early stage and appropriately update the recipe. Meanwhile, since excessive recipe update also causes a decrease in an operating time of the device, it is desirable to update the recipe at an appropriate timing.

Inventors of the present application have studied determining of the timing of the recipe update by evaluating the reliability of the ADC based on a classification accuracy rate as described in PTL 1, but have found that, in a case where a number of defects exist, performing of MDC for calculating the accuracy rate is very troublesome, and it is difficult to actually apply the MDC.

The disclosure is made in view of the above problems, and an object thereof is to provide a defect classification device capable of easily grasping an appropriate recipe update timing of an imaging device when classification accuracy for classifying defects existing on a semiconductor wafer is decreased.

Solution to Problem

A defect classification device according to the disclosure calculates classification accuracy by further acquiring a result of a manual classification for defects spanning a plurality of classification spaces as a result of an automatic classification, and comparing the result of the automatic classification with the result of the manual classification.

Advantageous Effect

According to the defect classification device of the disclosure, an appropriate recipe update timing of an imaging device can be easily grasped when the classification accuracy for classifying defects existing on a semiconductor wafer is decreased.

DESCRIPTION OF EMBODIMENTS

Figure 1:
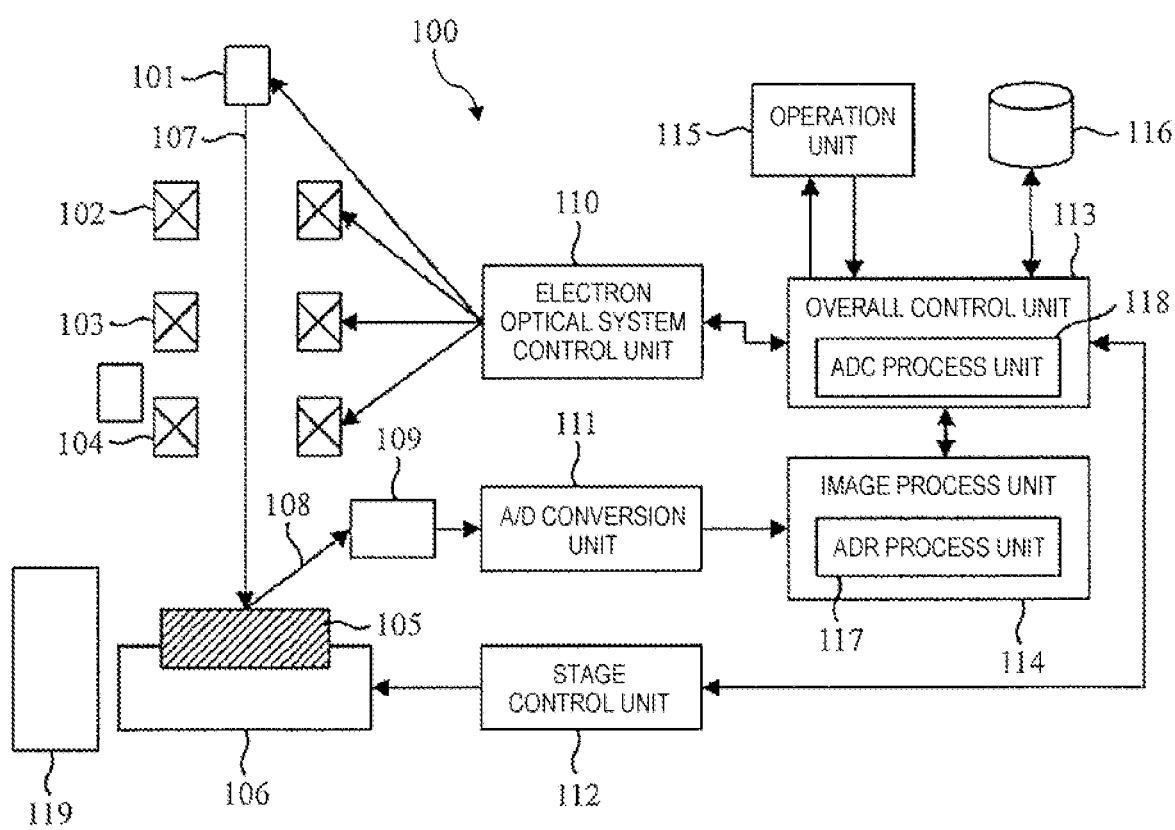
FIG. 1 is a schematic diagram illustrating an overall configuration of a defect observation device 100.

FIG. 1 is a schematic diagram illustrating an overall configuration of a defect observation device 100 according to an embodiment of the disclosure. The defect observation device 100 of FIG. 1 is a device that acquires an observation image of a sample 105 by an SEM and observes a defect in the observation image.

The defect observation device 100 includes an electron optical system, a stage 106, an electron optical system control unit 110, an A/D conversion unit 111, a stage control unit 112, an overall control unit 113, an image process unit 114, an operation unit 115, a storage device 116, and an optical microscope 119. The electron optical system, the electron optical system control unit 110, the A/D conversion unit 111, the stage 106, and the stage control unit 112 constitute a scanning electron microscope, which is a kind of an image generation tool.

The electron optical system includes optical elements such as an electron gun 101, a lens 102, a scanning deflector 103, an objective lens 104, the sample 105, and a secondary particle detector 109. The stage 106 moves a sample stage holding the sample 105 in an XY plane. The electron optical system control unit 110 controls the various optical elements in the electron optical system. The A/D conversion unit 111 quantizes an output signal of the secondary particle detector 109. The stage control unit 112 controls the stage 106. The operation unit 115 inputs an operation instruction for operating the defect observation device 100. The storage device 116 stores control information of a defect review device, and image data used for an ADR or an ADC to be described later.

A primary electron beam 107 emitted from the electron gun 101 is focused by the lens 102, deflected by the scanning deflector 103, and then focused by the objective lens 104, and emitted onto the sample 105. Secondary particles 108 such as secondary electrons and reflected electrons are generated from the sample 105 irradiated with the primary electron beam 107 according to a shape and a material of the sample. The generated secondary particles 108 are detected by the secondary particle detector 109, and then converted into digital signals by the A/D conversion unit 111. The output signal of the secondary particle detector 109 converted into the digital signal may be referred to as an image signal. An output signal of the A/D conversion unit 111 is input to the image process unit 114, and the image process unit 114 forms an SEM image of the sample 105. The image process unit 114 further includes an ADR process unit 117. The ADR process unit 117 executes an image process such as defect detection by using the SEM image.

The stage control unit 112 controls a position of the sample 105 by controlling the stage 106. The overall control unit 113 comprehensively controls the entire defect observation device 100. The overall control unit 113 interprets an input from the operation unit 115 or the storage device 116, controls the electron optical system control unit 110, the stage control unit 112, the image process unit 114, and the like in accordance with the interpretation, and outputs a process result to a display unit 206 (described later) or the storage device 116 as necessary.

An automatic classification process of the defect is executed by the overall control unit 113. The overall control unit 113 includes an ADC process unit 118 that performs the ADC. The ADC process unit 118 executes the ADC by using a defect image extracted by the ADR process unit 117 or a defect image stored in the storage device 116.

Figure 2:
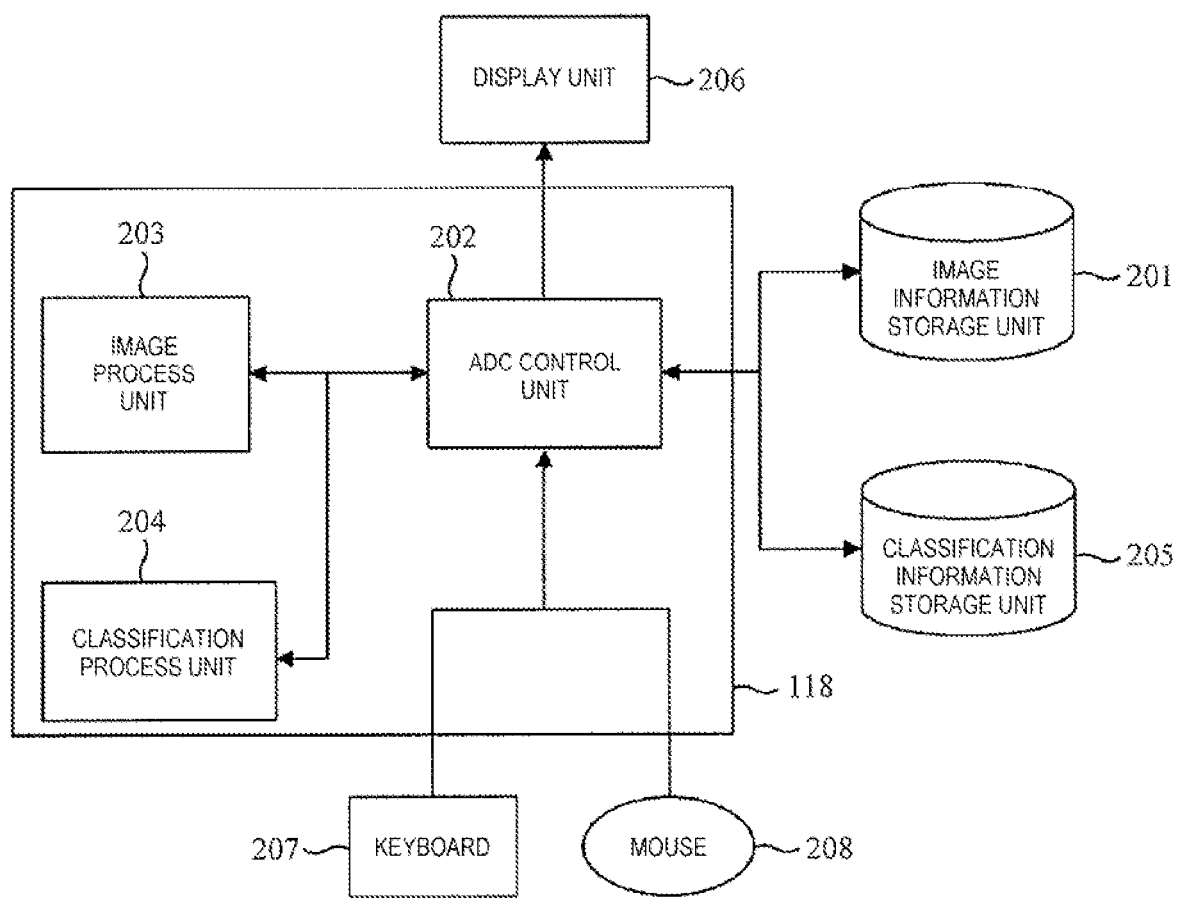
FIG. 2 is a functional block diagram illustrating a configuration example of an ADC process unit 118.

FIG. 2 is a functional block diagram illustrating a configuration example of the ADC process unit 118. The image process unit 114 or the overall control unit 113 can be implemented by a computer system. The computer system includes an arithmetic device such as a central processing unit (CPU). The image process unit 114 and the overall control unit 113 may be implemented by a single computer system or may be implemented by individual computer systems.

The ADC process unit 118 includes a plurality of functional blocks implemented by the arithmetic device in the computer system executing a predetermined program. The ADC process unit 118 includes an ADC control unit 202, an image process unit 203, and a classification process unit 204. The ADC control unit 202 controls an entire ADC process. The image process unit 203 performs a preprocess necessary for a defect classification. The classification process unit 204 executes an actual defect classification process by using image data preprocessed by the image process unit 203.

An image information storage unit 201 and a classification information storage unit 205 are connected to the ADC process unit 118. The image information storage unit 201 stores the image data preprocessed by the image process unit 203. The classification information storage unit 205 stores a classification result executed by the classification process unit 204. The classification information storage unit 205 further stores a result of an MDC as verification data for verifying a result of the ADC. Physically, these storage units correspond to a partition, a logical volume, a file system, or the like provided in the storage device 116.

A keyboard 207, a mouse 208, and the display unit 206 are connected to the ADC process unit 118. The keyboard 207 and the mouse 208 constitute the operation unit 115. The display unit 206 displays a process result of the ADC and a graphical user interface (GUI) for giving an instruction to the defect observation device 100.

Image data of the defect image acquired by the scanning electron microscope is stored in the image information storage unit 201. The ADC control unit 202 reads the image data from the image information storage unit 201 and transfers the image data to the image process unit 203. The image process unit 203 calculates various features (for example, a size, a shape, a luminance distribution, a texture, or the like of a defect portion, or a size, a shape, a luminance distribution, a texture, or the like of a background pattern, or a positional relation between the defect portion and the background pattern) of the observation image necessary for the classification process from the transferred image data, and stores the various features in the image information storage unit 201.

The ADC control unit 202 reads feature data stored in the image information storage unit 201 and transfers the feature data to the classification process unit 204. The classification process unit 204 classifies the defects based on a predetermined classification model, and stores a classification result in the classification information storage unit 205.

The classification model includes a teaching type and a rule-based type. The teaching type automatically constitutes a classifier by teaching the feature data associated with a correct classification result. For example, in a feature space based on the teaching data, a boundary is defined to divide the feature space, and associate the feature space with each category, and which feature space a classification target belongs to is determined. Accordingly, the defect can be classified into each category. Methods for defining the boundary of the feature space include (a) a method of classifying the defects into a category of a taught defect having a shortest distance on the feature space, (b) a method of estimating a feature distribution of each defect category based on the teaching data and classifying the defects into a category having a highest occurrence probability of the feature of the defect to be classified, and the like. These methods are basic types of the teaching type classification.

The rule-based type is, for example, a method of classifying according to a rule described in if-then-else, and is typically a classification model having a binary tree structure in which a set of defects to be classified is repeatedly divided into two and finally classified into respective categories. The rule-based type classification is put into practical use as an expert system or a business rules management system (BRMS). When a rule-based type algorithm is applied to an ADC in a semiconductor or a liquid crystal inspection/observation device, unevenness of the defect portion, a positional relation between the defect portion and the background pattern, and the like are often defined as basic rules.

A program for performing the defect classification based on the classification model is stored in the storage device 116, and a classification process function of the classification process unit 204 is implemented by the arithmetic device of the computer system executing the program. An execution instruction of various processes, a selection of process target data, and the like can be instructed from the operation unit 115. An execution process such as an instruction content, a classification process, and storage described above is displayed on the display unit 206, and a device user can confirm a process content of the ADC by confirming a display content.

The ADC process unit 118 is not necessarily provided inside the overall control unit 113, and may be implemented by an information process unit provided independently of the overall control unit 113. Further, the same ADC process can be performed in parallel by a plurality of information processing units connected to the overall control unit 113.

Figure 3:
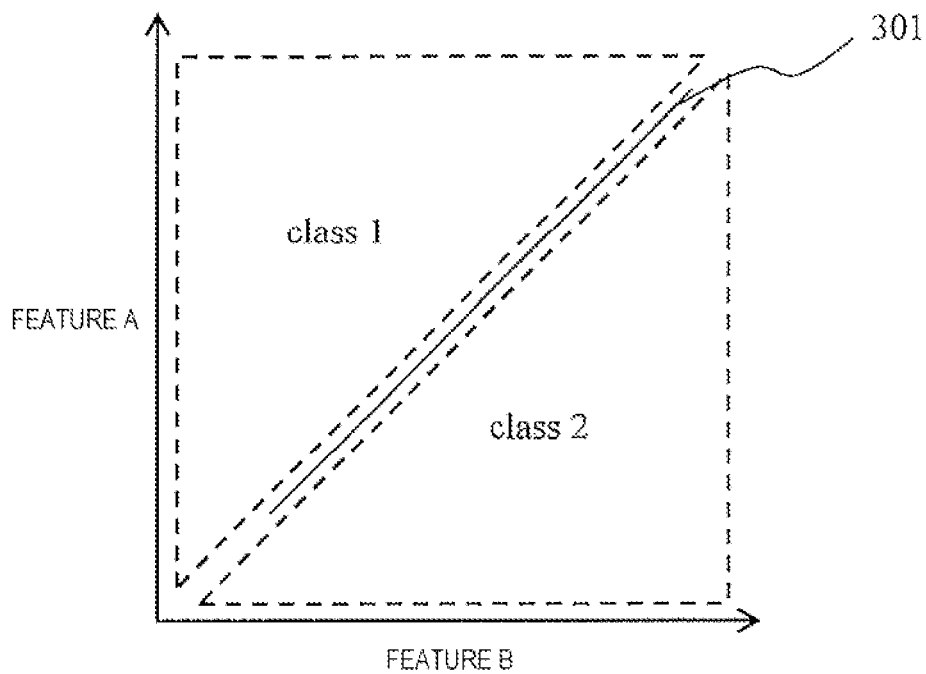
FIG. 3 is a diagram illustrating an outline of a feature space used in a defect classification by the ADC process unit 118.

FIG. 3 is a diagram illustrating an outline of the feature space used in the defect classification by the ADC process unit 118. As illustrated in FIG. 3, in order to classify the defect according to the feature such as a size or a shape, the feature space is divided into a plurality of feature spaces by setting a boundary 301 (parameter) in the feature space. Each feature space corresponds to a defect classification. The ADC process unit 118 can classify the defect by determining which feature space the defect belongs to.

FIG. 3 illustrates the classification model having two-tree structure in which a two-dimensional feature space is classified into two defect classes (a first feature space and a second feature space), but an algorithm other than the two-tree structure can also be used. Further, a multidimensional space model may be employed, or a plurality of boundaries may be set in a space.

Figure 4:
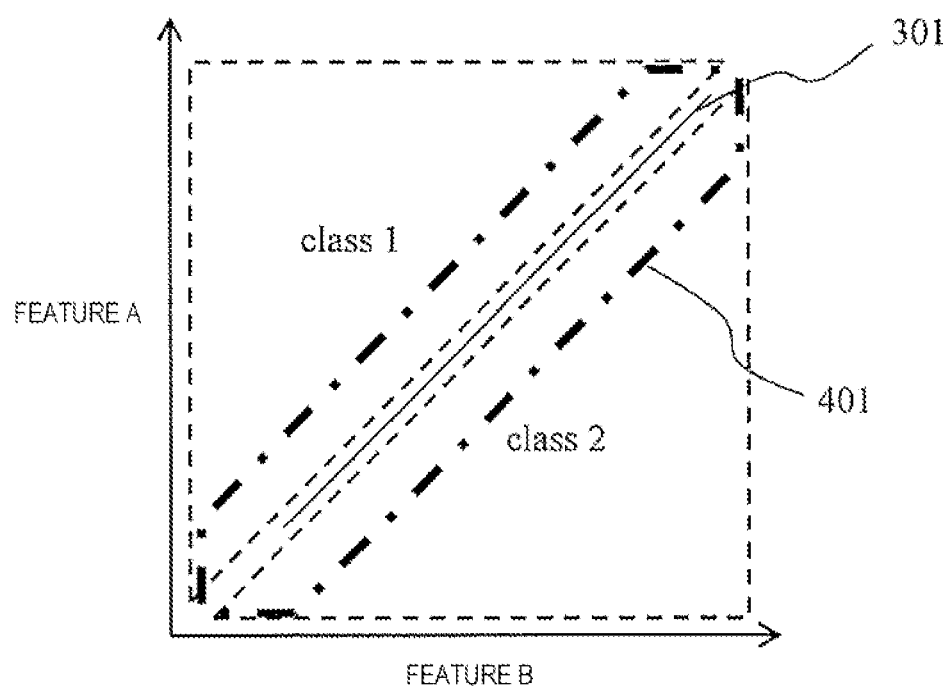
FIG. 4 illustrates an example of another classification model used by the ADC process unit 118.

The classification process unit 204 classifies the defects into a plurality of classes (two classes of a class 1 and a class 2 in the example of FIG. 3) by using the classification model illustrated in FIG. 3, and further provides a new classification class (third feature space) as illustrated in FIG. 4 to classify the defects.

FIG. 4 illustrates an example of another classification model used by the ADC process unit 118. A difference from FIG. 3 is that a new unknown class 401 (a region indicated by a dot-dash line in a feature space of FIG. 4) is newly provided. The unknown class 401 is set so as to overlap at least two or more classification classes and include the boundary 301 between classifications.

A defect classified into the unknown class 401 is a defect that is highly likely to be classified into a category different from an originally classified category due to a change in some device parameters. That is, the defect can be defined as a defect having a relatively high possibility of being erroneously classified as compared with other defects at an early stage of the occurrence of factors that cause a decrease in the classification accuracy. In the present embodiment, such a defect is specified, and an appropriate update timing of an inspection condition (recipe) is estimated (calculated) based on the classification result.

Figure 5:
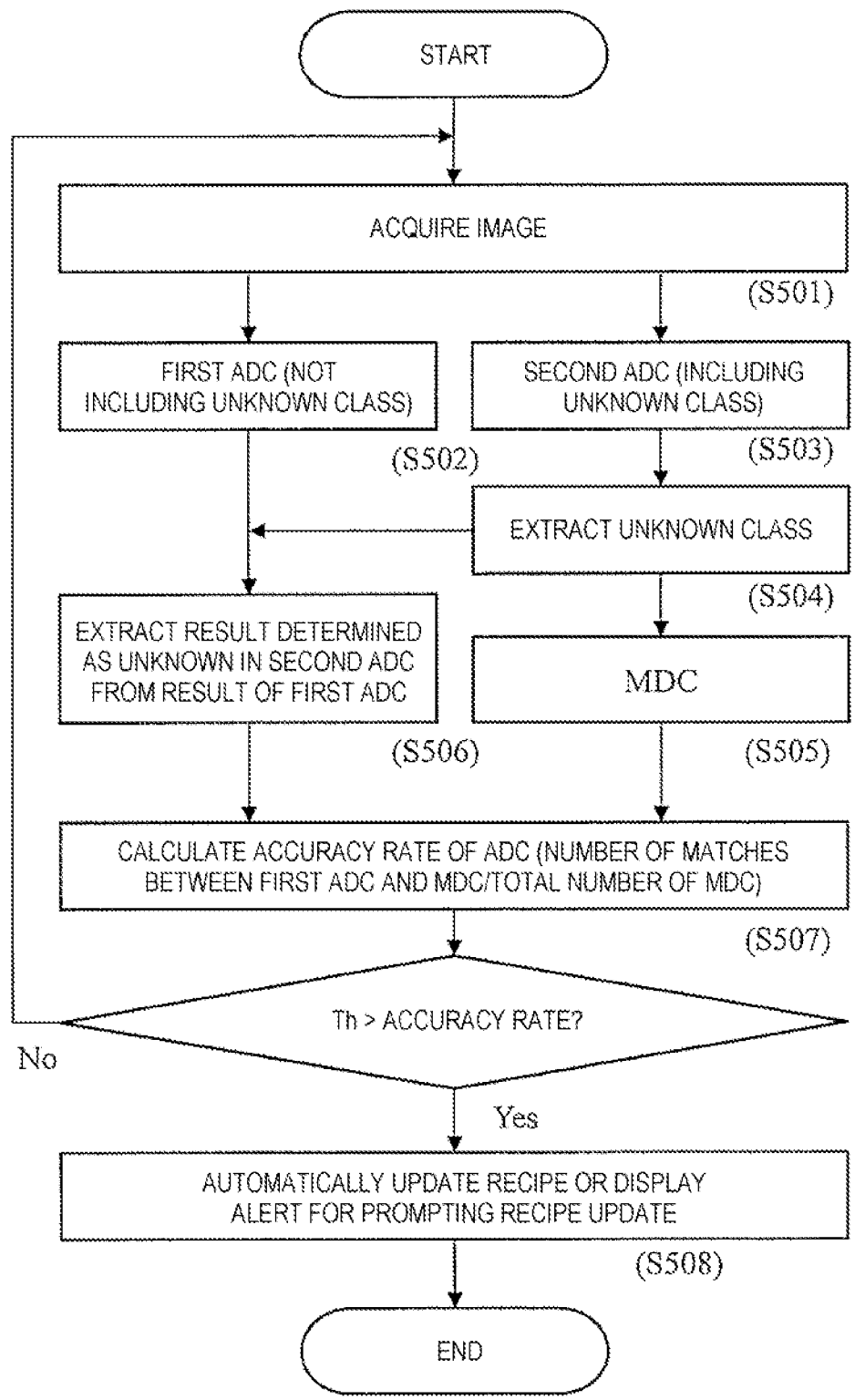
FIG. 5 is a flowchart illustrating a procedure for determining whether an inspection condition is updated according to accuracy of a defect classification result by the defect observation device 100.

FIG. 5 is a flowchart illustrating a procedure for determining whether the defect observation device 100 updates the inspection condition according to accuracy of a defect classification result. This flowchart can be implemented by the overall control unit 113 (and other functional units). Hereinafter, each step of FIG. 5 will be described.

(FIG. 5: Step S501)

The overall control unit 113 specifies a position of the defect based on an output of a higher-level defect inspection device (for example, an optical inspection device), and controls the stage control unit 112 and the electron optical system control unit 110 so that a visual field of the defect observation device 100 is positioned at the position, thereby acquiring an image of the defect.

(FIG. 5: Steps S502 and S503)

The ADC process unit 118 executes the ADC process on the obtained image. In the present embodiment, a first ADC (an ADC process using the model as illustrated in FIG. 3) and a second ADC (an ADC process using a model as illustrated in FIG. 4) are respectively executed. The present embodiment describes an example of classifying, by the two ADC processes, a defect included in both the class 1 and the unknown class 401 (a defect belonging to a first classification), a defect included in both the class 2 and the unknown class (a defect belonging to a second classification), a defect included in the class 1 but not included in the unknown class (a defect belonging to a third classification), and a defect included in the class 2 but not included in unknown class (a defect belonging to a fourth classification), but the classification as described above may be performed by one ADC process.

(FIG. 5: Step S504)

The ADC process unit 118 extracts a defect classified into the unknown class 401 by the second ADC. The ADC process unit 118 stores information on the extracted defect in the storage device 116. This defect is used as the evaluation target defect used for evaluating the classification accuracy in a step to be described later.

(FIG. 5: Step S505)

Figure 6:
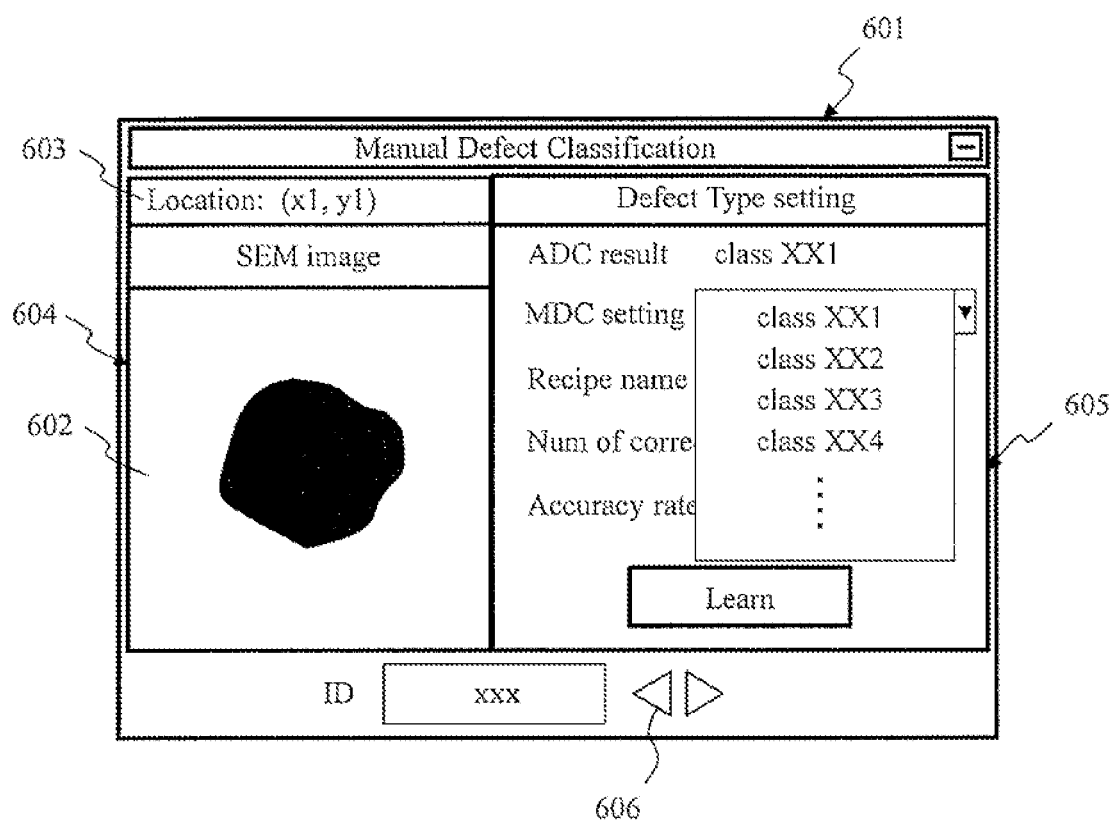
FIG. 6 illustrates an example of a user interface screen used for performing an MDC in S505 by a user.

The overall control unit 113 prompts a user on a user interface to perform the MDC on the defect extracted in S504. The user performs the MDC on the defect by using a user interface as illustrated in FIG. 6, which will be described later.

(FIG. 5: Step S506)

The ADC process unit 118 extracts the defect classified into the unknown class 401 in the second ADC (S503) from a classification result in the first ADC (S502).

(FIG. 5: Step S507)

The overall control unit 113 acquires the number of defects subjected to the MDC in S505 (that is, the number of defects extracted as the unknown classes in S504) as the MDC total number. The ADC process unit 118 further acquires the number of correct defects in which the classification result in the first ADC (S502) and the classification result in the MDC (S505) match among the defects belonging to the unknown class. The overall control unit 113 outputs the number and the ratio (the number of correct defects/the number of defects belonging to the unknown class) as an evaluation result of the classification accuracy.

Here, instead of calculating the number of all defects belonging to the unknown class, a part thereof may be substituted into an arithmetic expression. For example, a defect that is close to the boundary of the feature space is high likely to be erroneously classified. Accordingly, the calculation is preferably performed by using the number of defects that are relatively far from the boundary among the defects belonging to the unknown class. In this case, for example, two or more classification classes may be provided in the unknown class, such as a region (unknown class 1) close to the boundary in the unknown class and a region (unknown class 2) relatively far from the boundary with respect to the unknown class 1, and the number of defects belonging to the unknown class 2 (defects at positions some distance from the boundary) is preferably used for the calculation.

(FIG. 5: Step S508)

When an accuracy rate of the first ADC is high (equal to or higher than a predetermined threshold value or higher than the predetermined threshold value), it can be said that the inspection condition is appropriately selected. When the accuracy rate of the first ADC is low (less than the predetermined threshold value or equal to or less than the predetermined threshold value), it is considered that the inspection condition is not appropriately set. Therefore, when the accuracy rate is equal to or lower than a predetermined value or is lower than the predetermined value, the overall control unit 113 automatically updates the recipe or causes the display unit 206 to display an alert for prompting the recipe update. In this manner, high classification accuracy of the ADC can be maintained while preventing a decrease in an operation rate of the defect observation device 100 caused by performing an excessive recipe update.

FIG. 6 illustrates an example of a user interface screen used for performing the MDC in S505 by the user. A GUI screen 601 is displayed on the display unit 206. The GUI screen 601 includes a display column 604 for displaying an image 602 of the defect classified into the unknown class together with accompanying information 603 (defect coordinates and the like), and a display column 605 for giving defect information obtained by the MDC. Further, a switching button 606 for switching a defect image classified into the unknown class is provided.

The display column 605 is provided with a display unit that displays the classification result (ADC result) of the first ADC. This display unit displays the result obtained by performing the first ADC with respect to the defect classified into the unknown class by the second ADC. Further, the display column 605 is provided with a setting column (MDC setting) for enabling a manual defect classification. An operator can select an appropriate defect type from a pull-down screen while visually confirming the image 602.

The display column 605 further displays a display unit of a recipe name (recipe name) which is an operation program of the scanning electron microscope, a display unit which displays the number of changes(number of corrections) in the classification result of the first ADC by the MDC, and the accuracy rate of the first ADC (accuracy rate=the number of correct defects classified by the first ADC among the defects classified into the unknown class/the total number of defects classified into the unknown class).

Figure 7:
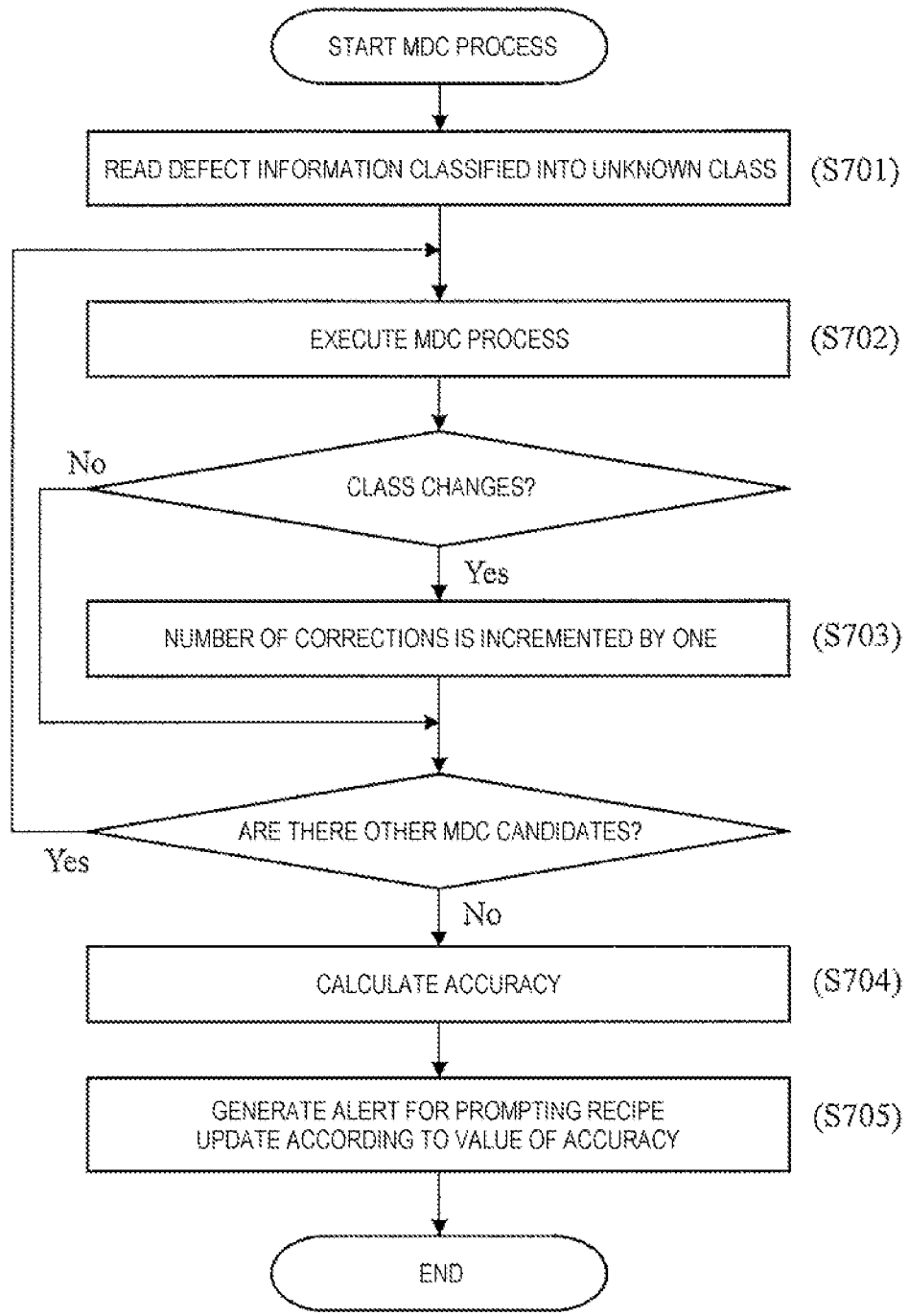
FIG. 7 is a flowchart illustrating an MDC process.

FIG. 7 is a flowchart illustrating an MDC process. This flowchart is performed by the overall control unit 113 when the user performs the MDC by using the GUI screen 601. This flowchart corresponds to S505 and S507. Hereinafter, each step of FIG. 7 will be described.

(FIG. 7: Steps S701 and S702)

The overall control unit 113 reads defect information classified into the unknown class by the second ADC from the classification results of the first ADC (S701 and S506). The GUI screen 601 displays the read information. The user performs the MDC process on the GUI screen 601 (S702). As illustrated in FIG. 6, the MDC can be performed while confirming whether an output of the first ADC is appropriate by displaying an image of a foreign substance or a defect (SEM image in the present embodiment) and the result of the first ADC together.

(FIG. 7: Step S703)

The overall control unit 113 determines whether the class (the type of the defect or the foreign substance) in the result of the first ADC has been changed by the MDC. If the class is changed, the number of corrections is incremented by one. The number of MDC processes is equal to the number of images classified into the unknown class. The number of corrections is equal to the number of images in which the classification result of the first ADC is changed by the MDC.

(FIG. 7: Step S704)

The overall control unit 113 calculates the classification accuracy (accuracy) by using the result obtained by subtracting the number of execution of the MDC from the number of classifications into the unknown class as a numerator and using the number of images classified into the unknown class as a denominator. Although the accuracy is an index value indicating how accurate the classification result of the first ADC is, another index may be used as long as the index value can evaluate the reliability of the classification result of the first ADC. For example, the classification accuracy may be evaluated by calculating an unreliable degree (the number of changes in the classification results due to the MDC/the number of classifications into the unknown class) and outputting the calculated degree.

(FIG. 7: Step S705)

The overall control unit 113 compares the classification accuracy with a determination threshold value stored in advance. When the classification accuracy is equal to or higher than the determination threshold value, it is regarded as normal, and when the classification accuracy is equal to or less than the threshold value or is less than the threshold value, the overall control unit 113 generates the alert for prompting the recipe update.

Figure 8:
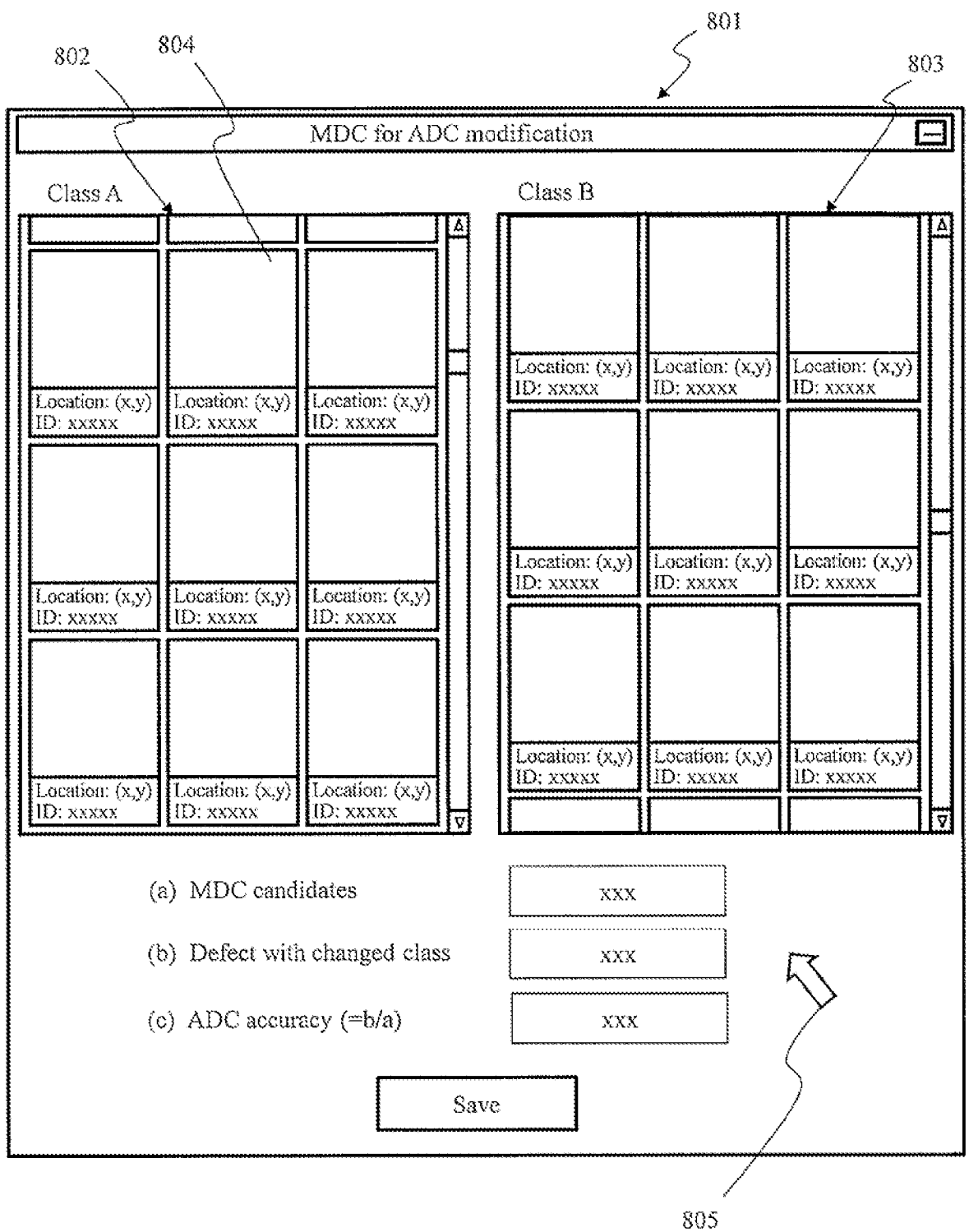
FIG. 8 illustrates an example of a user interface used for correcting a classification while comparing a classification result of a first ADC and a classification result of a second ADC after the flowchart of FIG. 5 is performed.

FIG. 8 illustrates an example of the user interface used for correcting the classification while comparing the classification result of the first ADC and a classification result of the second ADC after the flowchart of FIG. 5 is performed. A GUI screen 801 (correction interface) includes (a) a display column 802 for displaying SEM images of the defects classified into a class A by the first ADC and a plurality of thumbnails 804 for displaying accompanying information, and (b) a display column 803 for displaying SEM images of the defects classified into a class B by the first ADC and a plurality of thumbnails for displaying accompanying information.

The user visually determines the images classified into the class A and the class B by the first ADC, and when the classification by the first ADC is incorrect, the user replaces the thumbnail 804 with another category by a pointing device 805.

An MDC candidates column displays the total number of the images classified into the unknown class by the second ADC. A defect with changed class column displays the total number of images in which the category is changed by the MDC. An ADC accuracy column displays the classification accuracy calculated in S704. The user can determine the recipe update timing based on parameters for quantitatively evaluating the reliability of the ADC in accordance with these numerical values.

<Modification of the Disclosure>

In the above embodiment, the image process unit 114 (including the ADR process unit 117) or the overall control unit 113 (including the ADC process unit 118) can be implemented by either hardware or software. When the ADR process unit 117 or the ADC process unit 118 is implemented by hardware, the ADR process unit 117 or the ADC process unit 118 can be implemented by integrating a plurality of arithmetic units for executing a process necessary for an ADR or an ADC on a wiring substrate or one semiconductor chip or package, and when the ADR process unit 117 or the ADC process unit 118 is implemented by software, the ADR process unit 117 or the ADC process unit 118 can be implemented by mounting a high-speed general-purpose CPU or GPU in the ADR process unit 117 or the ADC process unit 118, and executing a program (component) that performs a process of the ADR or the ADC.

In the above embodiment, when the image process unit 114 and the overall control unit 113 are implemented by software, the software can be stored in a hard disk or other storage media. The software can be configured as a defect program describing a defect classification process executed by the defect observation device 100 in the disclosure.

REFERENCE SIGN LIST 101 electron gun
102 lens
103 scanning deflector
104 objective lens
105 sample
106 stage
10π electron beam
108 secondary particle
109 secondary particle detector
110 electron optical system control unit
111 A/D conversion unit
112 stage control unit
113 overall control unit
114 image process unit
115 operation unit
116 storage device
117 ADR process unit
118 ADC process unit
119 optical microscope
201 image information storage unit
202 ADC control unit
203 image process unit
204 classification process unit
205 classification information storage unit
206 display unit
207 keyboard
208 mouse

The invention claimed is:

1. A defect classification device configured to classify at least one defect on a wafer, the device comprising:
an image acquisition unit configured to acquire an observation image from an imaging device configured to capture the observation image of the wafer;
a computer system configured to classify the at least one defect in the observation image; and
a user interface configured to input an operation instruction for manually classifying the at least one defect in the observation image, wherein
the computer system is configured to
classify the at least one defect in the observation image into one of
a first feature space,
a second feature space different from the first feature space, and
a third feature space spanning both the first feature space and the second feature space,
further receive a result of a manual classification via the user interface for each defect classified into the third feature space among the at least one defect, and
calculate and output an index indicating classification accuracy of the at least one defect by using a result of classifying the at least one defect into the third feature space by the computer system and the result of the manual classification,
wherein, when the classification accuracy is less than a threshold value, the computer system is configured to change an imaging condition used when the imaging device acquires the observation image or to output an alert for prompting the change, and
wherein two or more classification classes are provided in an unknown class, including a first unknown class corresponding to a region closer to a boundary between the two or more classification classes and a second unknown class corresponding to a region farther from the boundary, and a number of defects belonging to the second unknown class is used to calculate the index.

2. The defect classification device according to claim 1, wherein the computer system is configured to
perform a first classification step of classifying the at least one defect into one of the first feature space and the second feature space,
perform a second classification step of classifying the at least one defect into one of the first feature space, the second feature space, and the third feature space,
extract, from a classification result in the first classification step, each defect classified into the third feature space in the second classification step as an evaluation target defect to be used for classification accuracy determination, and
determine the classification accuracy by using a number of defects classified into the third feature space in the second classification step and the number of defects classified into the third feature space by the manual classification.

3. The defect classification device according to claim 2, wherein the computer system is configured to
acquire, a number of correct defects in which a classification result by the manual classification matches the classification result by the first classification step among the defects classified into the third feature space in the second classification step, and
output, as the classification accuracy, a value obtained by dividing the number of the correct defects by the number of the defects classified into the third feature space in the second classification step.

4. The defect classification device according to claim 1, wherein the computer system is configured to
perform a first classification step of classifying the at least one defect into one of the first feature space and the second feature space, and
perform a second classification step of classifying the at least one defect into one of the first feature space, the second feature space, and the third feature space, and
the user interface includes a correction interface used for correcting a result of the first classification step while comparing a classification result by the first classification step with a classification result by the second classification step.

5. The defect classification device according to claim 1, wherein
the third feature space includes at least a part of a boundary between the first feature space and the second feature space.

6. A non-transitory computer-readable medium storing a defect classification program causing a computer to execute a process of classifying at least one defect on a wafer, the process including:
a step of acquiring an observation image from an imaging device configured to capture the observation image of the wafer;
a step of classifying the at least one defect in the observation image; and
a step of receiving an operation instruction from a user interface for inputting the operation instruction for manually classifying the at least one defect in the observation image,
in the step of classifying the at least one defect, the defect classification program causes the computer to classify the at least one defect in the observation image into one of
a first feature space, a second feature space different from the first feature space, and a third feature space spanning both the first feature space and the second feature space, and the defect classification program causes the computer to further execute a step of further receiving a result of a manual classification via the user interface for each defect classified into the third feature space among the at least one defect, and a step of calculating and outputting an index indicating classification accuracy of the at least one defect by using a result of the step of classifying the at least one defect and the result of the manual classification, wherein, when the classification accuracy is less than a threshold value, the computer is configured to change an imaging condition used when the imaging device acquires the observation image or to output an alert for prompting the change, and wherein two or more classification classes are provided in an unknown class, including a first unknown class corresponding to a region closer to a boundary between the two or more classification classes and a second unknown class corresponding to a region farther from the boundary, and a number of defects belonging to the second unknown class is used to calculate the index.

* * * * *